(12) United States Patent
Lin et al.

(10) Patent No.: US 7,124,137 B2
(45) Date of Patent: Oct. 17, 2006

(54) METHOD, SYSTEM, AND PROGRAM FOR OPTIMIZING PROCESSING OF NESTED FUNCTIONS

(75) Inventors: Fen-Ling Lin, San Jose, CA (US); Yao Ching Stephen Chen, Saratoga, CA (US); Yun Wang, Saratoga, CA (US); Guogen Zhang, San Jose, CA (US); Mengchu Cai, Redmond, WA (US); Jason Alexander Cu, San Jose, CA (US); Li-Mey Lee, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 10/325,781

(22) Filed: Dec. 19, 2002

(65) Prior Publication Data
US 2004/0122795 A1 Jun. 24, 2004

(51) Int. Cl.
G06F 17/30 (2006.01)
G06F 15/177 (2006.01)
(52) U.S. Cl. .................. 707/100; 707/4; 709/223
(58) Field of Classification Search .............. 707/1, 707/3, 201; 713/513, 866
See application file for complete search history.

(56) References Cited

U.S. PATENT DOCUMENTS

| 5,089,985 A | 2/1992 | Chang et al. ............... 707/2 |
| 5,428,737 A | 6/1995 | Li et al. ........................ 707/4 |
| 5,764,973 A | 6/1998 | Lunceford et al. ............ 707/1 |
| 5,778,354 A | 7/1998 | Leslie et al. ................. 707/2 |
| 5,822,747 A | 10/1998 | Graefe et al. ................. 707/2 |
| 5,845,299 A | 12/1998 | Arora et al. ................ 715/513 |
| 5,911,145 A | 6/1999 | Arora et al. ................ 715/514 |
| 6,070,175 A | 5/2000 | Mezei ......................... 715/500 |
| 6,105,024 A | 8/2000 | Graefe et al. ................... 707/7 |
| 6,198,480 B1 | 3/2001 | Cotugno et al. ............ 715/866 |
| 6,233,610 B1* | 5/2001 | Hayball et al. ............. 709/223 |
| 6,356,906 B1 | 3/2002 | Lippert et al. .............. 715/762 |
| 6,356,920 B1 | 3/2002 | Vandersluis .............. 715/501.1 |
| 6,405,191 B1 | 6/2002 | Bhatt et al. ..................... 707/3 |
| 6,487,546 B1 | 11/2002 | Witkowski |
| 6,604,100 B1* | 8/2003 | Fernandez et al. ............. 707/3 |
| 6,941,521 B1 | 9/2005 | Lin et al. |
| 2001/0037345 A1 | 11/2001 | Kiernan et al. |
| 2002/0013790 A1 | 1/2002 | Vandersluis |
| 2002/0116412 A1* | 8/2002 | Barnes et al. .............. 707/513 |
| 2003/0182268 A1* | 9/2003 | Lal .............................. 707/3 |

(Continued)

FOREIGN PATENT DOCUMENTS

WO 0182133 11/2001

OTHER PUBLICATIONS

SQL/XML is Making Good Progress by Andrew Eisenberg and Jim Melton☐☐SIGMOD Record, vol. 31, No. 2, Jun. 2002 pp. 101-108.*

(Continued)

Primary Examiner—Jeffrey Gaffin
Assistant Examiner—Hassan Mahmoudi
(74) Attorney, Agent, or Firm—Janaki K. Davda; Konrad Raynes & Victor, LLP

(57) ABSTRACT

Disclosed is a method, system, and program for processing a function. A set of nested functions are received. A composite function is generated for the set of nested functions. A tagging template is generated for the set of nested functions that corresponds to the composite function. A result is produced by evaluating the composite function using the tagging template.

21 Claims, 8 Drawing Sheets

U.S. PATENT DOCUMENTS

2004/0073553 A1    4/2004   Brown et al.

OTHER PUBLICATIONS

Microsoft Corp., "Orthogonal Optimization of Subqueries and Aggregation," by Cesar A. Galindo-Legaria and Milind M. Joshi, pp. 571-581, from ACM SIGMOD 2001, May 21-24, Santa Barbara, CA, USA, ® 2001.

Dessaux, Claire, "Exchanging XML-Based Messages on the Oracle9i Application Server" pp. 48-51, [online], available from http://www.XML-Journal.com, vol. 2, issue4.

Institute of Electrical and Electronics Engineers, Inc. "XML and DB2," by Josephine Cheng and Jane Xu of IBM Corp., p. 569 from the 16th International Conference on Data Engineering, Feb. 28-Mar. 3, 2000, San Diego, California, p. 1, [online], http://www.computer.org/proceedings/icde/0506/05050569abs.html, printed on Aug. 29, 2002.

IBM Corp., XML and WebSphere Studio Application Developer—Part 3, SQI and SML, p. 1-4, [online] available from http://www7b.software.ibm.co..d/techjournal/0202_haggarty/haggarty.html, printed on Aug. 29, 2001.

Visual Studio Magazine, "Create Powerful Web Reports,": Use VB code to generate T-SQL queries . . . , by Roger Jennings, p. 1 [online] http://fawcette.com/Arc...j/2001/, printed on Aug. 29, 2001.

Syspro Times, Quarter 2, 2002, "XML Report Viewer," p. 1-8, [online] available from www.rte-cyber.com.

IBM Corp., Research Disclosure n444208, Apr. 2001, #208, p. 709, Conversion of Final Form Data, such as AFP, to XML.

IBM Corp., Research Disclosure n451156, Nov. 2001, #156, p. 1966, Generating Hierarchical XML Data froma flat (Non-Hierarchical) Data Source.

IBM Corp., Dossier No. AUS91990412, Sep. 30, 1999.

IBM Corp., Dossier No. AUS919990421, Sep. 30, 1999.

Canadian Patent Application Serial No. 2349905, filed Jun. 1, 2001, entitled "System and Method of Mapping Between Software Objects and Structured Language Element Based Documents", invented by T. Green, J. Warfield, and M. Beisiegel, PCT/US01/49577.

U.S. Appl. No. 09/409,598, filed Sep. 30, 1999, entitled "Extensible Markup Language (XML) Server Pages Having Custom Document Object Model (DOM) Tags", invented by C.S. Claussen, M.H. Conner, B.C. Zumbrunnen, and M.D. McClain.

U.S. Appl. No. 09/409,600, filed Sep. 30, 1999, entitled "Method for Processing a Document Object Model (DOM) Having Custom Tags", invented by C.S. Claussen, M.H. Conner, and B.C. Zumbrunnen.

Shanmugasundaram, J., E. Shekita, R. Barr, M. Carey, B. Lindsay, H. Pirahesh, & B. Reinwald, "Efficiently Publishing Relational Data as XML Documents", *The VLDB Journal*, 2001, 10: pp. 133-154.

U.S. Appl. No. 10/325,854, filed on Dec. 19, 2002, entitled "Method, System, and Program for Optimizing Aggregate Processing", invented by Y. Wang, F. Lin, Y.C.S. Chen, M. Cai, J.A. Cu, A.B. Lebovitz, L. Lee, & G. Zhang.

\* cited by examiner

METHOD, SYSTEM, AND PROGRAM FOR OPTIMIZING PROCESSING OF NESTED FUNCTIONS

CROSS-REFERENCE TO RELATED APPLICATIONS

The following are co-pending and commonly owned patent applications:

"SYSTEM AND METHOD OF MAPPING BETWEEN SOFTWARE OBJECTS AND STRUCTURED LANGUAGE ELEMENT BASED DOCUMENTS", by M. Beisiegal et al., application Ser. No. 2,349,905, filed on Jun. 7, 2001;

"METHOD FOR PROCESSING A DOCUMENT OBJECT MODEL (DOM) HAVING CUSTOM TAGS", by C. Claussen et al., application Ser. No. 09/409,600, filed on Sep. 30, 1999; and "EXTENSIBLE MARKUP LANGUAGE (XML) SERVER PAGES HAVING CUSTOM DOCUMENT OBJECT MODEL (DOM) TAG", by C. Claussen et al., application Ser. No. 09/409,598, filed on Sep. 30, 1999.

BACKGROUND OF THE INVENTION

1. Field of the Invention

The present invention is related to optimizing processing of nested functions.

2. Description of the Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

The SQL standard introduced a set of new Extensible Markup Language (XML) publishing functions, including scalar functions XMLELEMENT, XMLFOREST, and XMLCONCAT, and an aggregate function, XMLAGG. These functions take SQL data as input and generate XML data as output.

An XMLELEMENT function creates an XML element. In particular, the XMLELEMENT function receives an identifier for use in naming the created XML element, an optional set of attribute name/value items, and an optional list of values for the content of this element. An XMLELEMENT function returns an instance of type XMLType.

An XMLFOREST function creates a forest of XML elements, which contains an element for each of the XMLFOREST arguments. The XMLFOREST function converts each of its argument parameters to XML, and then returns an XML fragment that is the concatenation of these converted arguments.

An XMLCONCAT function creates a forest of XML elements. The XMLCONCAT function takes as input a series of XML values, concatenates the series of values, and returns the concatenated series.

An XMLAGG function is an aggregate function that produces a forest of XML elements from a collection of XML elements. In particular, the XMLAGG function concatenates XML values from each row in a group into a single XML value.

Additionally, an XMLATTRIBUTES function defines one or more XML attributes for the XML element created by the XMLELEMENT function. Syntactically, XMLELEMENT and XMLATTRIBUTES are also referred to as "specifications."

Due to the XML feature of element nesting for parent-child relationships and sequence concatenation, the XMLELEMENT, XMLFOREST, XMLCONCAT, and XMLAGG functions are commonly used in nesting and concatenation. Nested functions are ones in which one or more functions are included within another function. For example, SELECT statement (1) includes nested functions, with the XMLATTRIBUTES function and the XMLFOREST functions nested in the XMLELEMENT function:

SELECT XMLELEMENT (NAME "Emp", XMLAT-
   TRIBUTES (e.fname $\|$ ' '$\|$ e.lname AS "name"),
   XMLFOREST (e.birthday, e.dept AS "depart-
   ment")) FROM EMPLOYEE e;   (1)

A traditional function evaluation technique for nested functions is to evaluate the functions inside-out. That is, the inner most functions are evaluated first and their results are used as input to the next outer level function, whose outputs are used as input to the next outer level function, etc.

The SELECT statement (1) has the following arguments: fname, lname, birthday, and dept. The XMLATTRIBUTES function has an argument, which is the concatenation of fname and lname. The XMLFOREST function generates a forest of two elements, one for each argument birthday and dept.

Assuming that the following are input values for the arguments of SELECT statement (1): fname ='Jack', lname ='Lee', birthday='10-28-1960', and dept='shipping', the evaluation of SELECT statement (1) proceeds as follows. First, the XMLATTRIBUTES function is evaluated and XMLATTRIBUTES(e.fname $\|$ ' '$\|$ e.lname AS "name") evaluates to name="Jack Lee". Second, the XMLFOREST function is evaluated and XMLFOREST(e.birthday, e.dept AS "department") evaluates to two elements: <birthday>1960-10-28</birthday><department>shipping</department>. The bracketed text (e.g., <birthday>) is a start tag of an element in XML, and the bracketed text with a slash (e.g., </birthday>) is an end tag of the element. Third, the XMLELEMENT function is evaluated and XMLELEMENT (NAME "Emp", XMLATTRIBUTES (e.fname $\|$ ' '$\|$ e.lname AS "name"), XMLFOREST (e.birthday, e.dept AS "department")) evaluates to:

<Emp name="Jack Lee"><birthday>1960-10-28
  </birthday><department>shipping</depart-
  ment></Emp>

In this process, the result of each function is usually copied to generate the next level result. For example, the results of the XMLATTRIBUTES function and the XMLFOREST function are copied to generate the results of the XMLELEMENT function. The number of times data is copied is proportional to the levels of nesting. For example, since there are two levels of nesting, in SELECT statement (1), data is copied twice. Even with the simple example illustrated in SELECT statement (1), copying of data at each of the levels of nesting leads to inefficiency of the function evaluation due to data movement.

Moreover, since XML does not limit the number of levels of nesting, the number of levels of nesting for XML may be very large. Nesting levels of 7–14 are commonly seen. The large number of levels of nesting would require a great deal of copying of data, which is very inefficient when evaluating a function. In addition, if character large objects (CLOBs) are involved, the size of copied data is even larger.

Thus there is a need in the art for improved function processing.

SUMMARY OF THE INVENTION

Provided are a method, system, and program for processing a function. A set of nested functions is received. A composite function is generated for the set of nested functions. A tagging template is generated for the set of nested functions that corresponds to the composite function. A result is produced by evaluating the composite function using the tagging template.

The described implementations of the invention provide a method, system, and program for processing nested functions using a tagging template to describe the structure of the nesting and an intermediate result structure to store argument input values.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
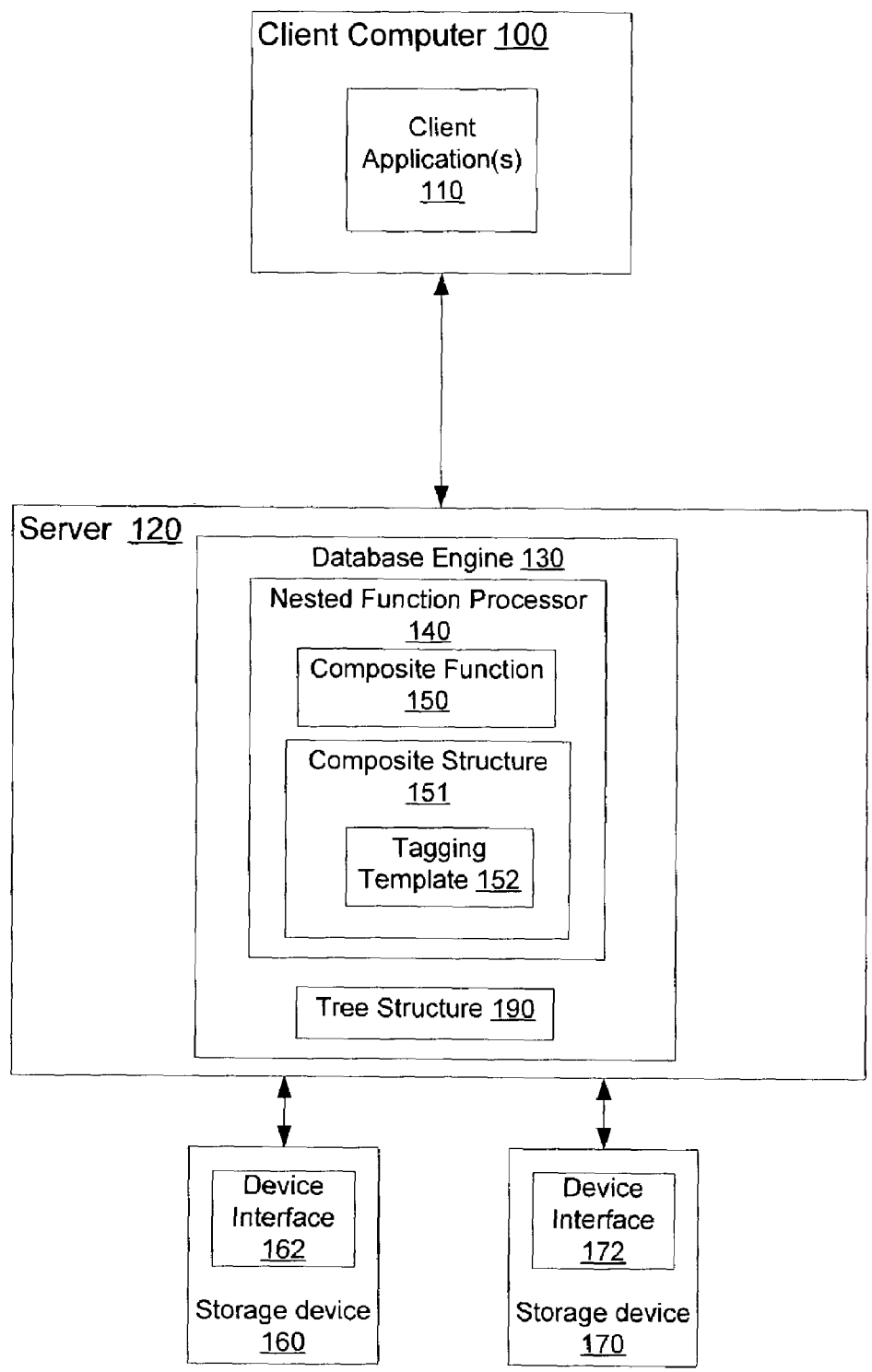
FIG. 1 illustrates, in a block diagram, a computing environment in accordance with certain implementations of the invention.

FIG. 1 illustrates, in a block diagram, a computing environment in accordance with certain implementations of the invention. A client computer 100 executes one or more client applications 110. A client application 110 may be any type of application program. The client computer 100 is connected to a management server 120 by a network, such as a local area network (LAN), wide area network (WAN), or the Internet. The Internet is a world-wide collection of connected computer networks (i.e., a network of networks).

Furthermore, the server 120 is connected to storage devices 160, 170, and each storage device 160, 170 has a device interface 162, 172. For example, each storage device 160 and 170 may be a redundant array of independent disks (RAID). A RAID device enables storage of the same data on multiple hard disks, thus allowing simultaneous accesses to copies of the data.

The client applications 110 may access data managed by the server 120. The server 120 includes a database engine 130, which includes a nested function processor 140. In certain implementations, the database engine 130 is a DB2® Universal Database (UDB) for z/OS, which is available from International Business Machines, Corporation.

In certain implementations, a new composite function 150 is provided for optimized processing of nested XML functions. The composite function 150 is generated for the highest level function in the set of nested functions (e.g., an XMLELEMENT function). The input to the composite function 150 is a list of arguments. When the composite function 150 is generated for the nested functions in SELECT statement (1), the first argument is a reference to a tagging template 152 and the remaining arguments are arguments in the nested functions. For example, the list of arguments may represent the arguments of XMLATTRIBUTES and XMLFOREST functions nested within an XMLELEMENT function. In certain implementations, the composite function 150 takes on the format of XMLCONSTRUCT function (2). The output of the composite function 150 is an intermediate result structure (e.g., such as the one illustrated in FIG. 4).

XMLCONSTRUCT (<reference to tagging template>, <list of remaining arguments>) (2)

Figure 3:
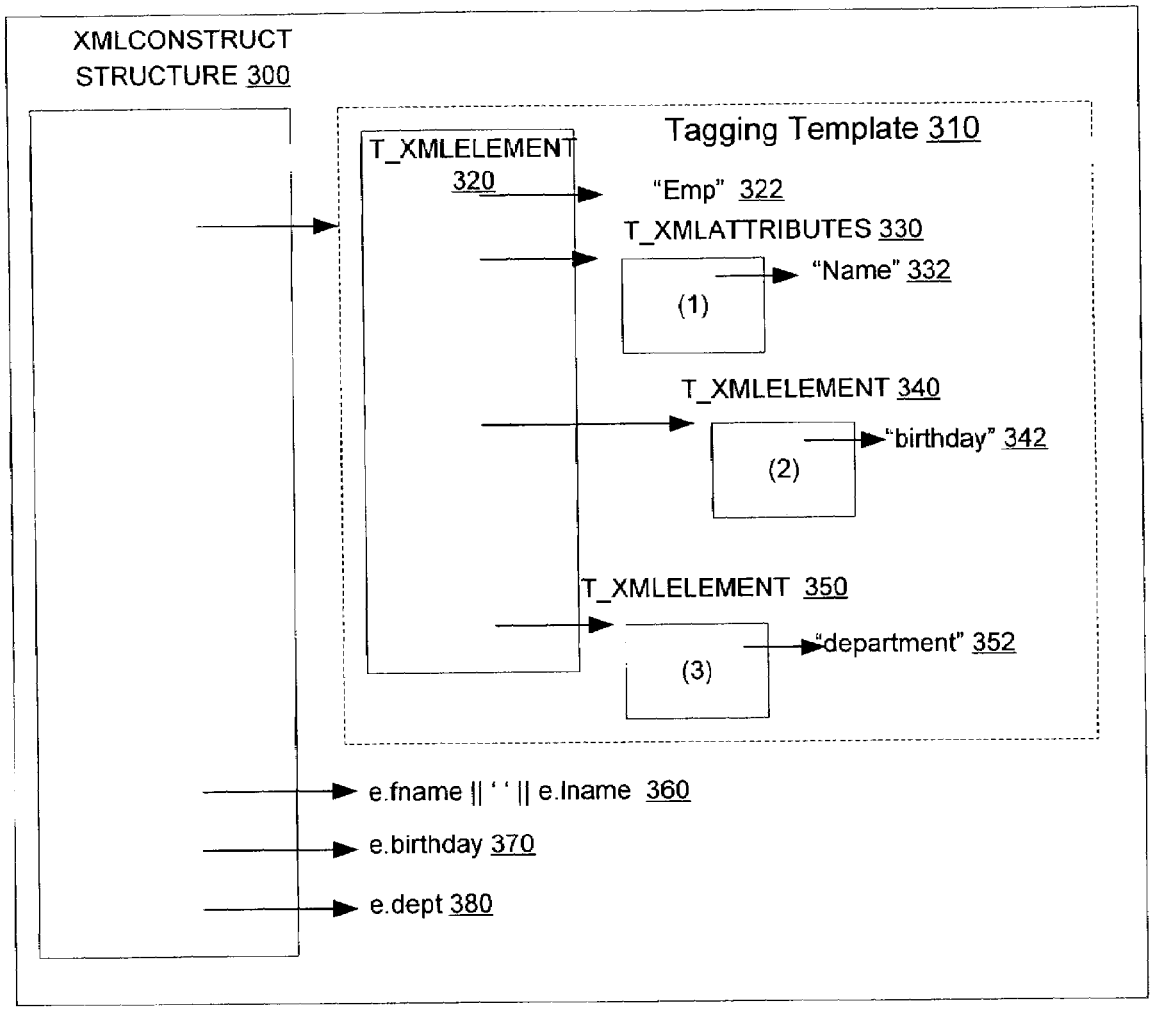
FIG. 3 illustrates a sample XMLCONSTRUCT structure representing an XMLCONSTRUCT function that is generated for nested functions in accordance with certain implementations of the invention.
Figure 5:
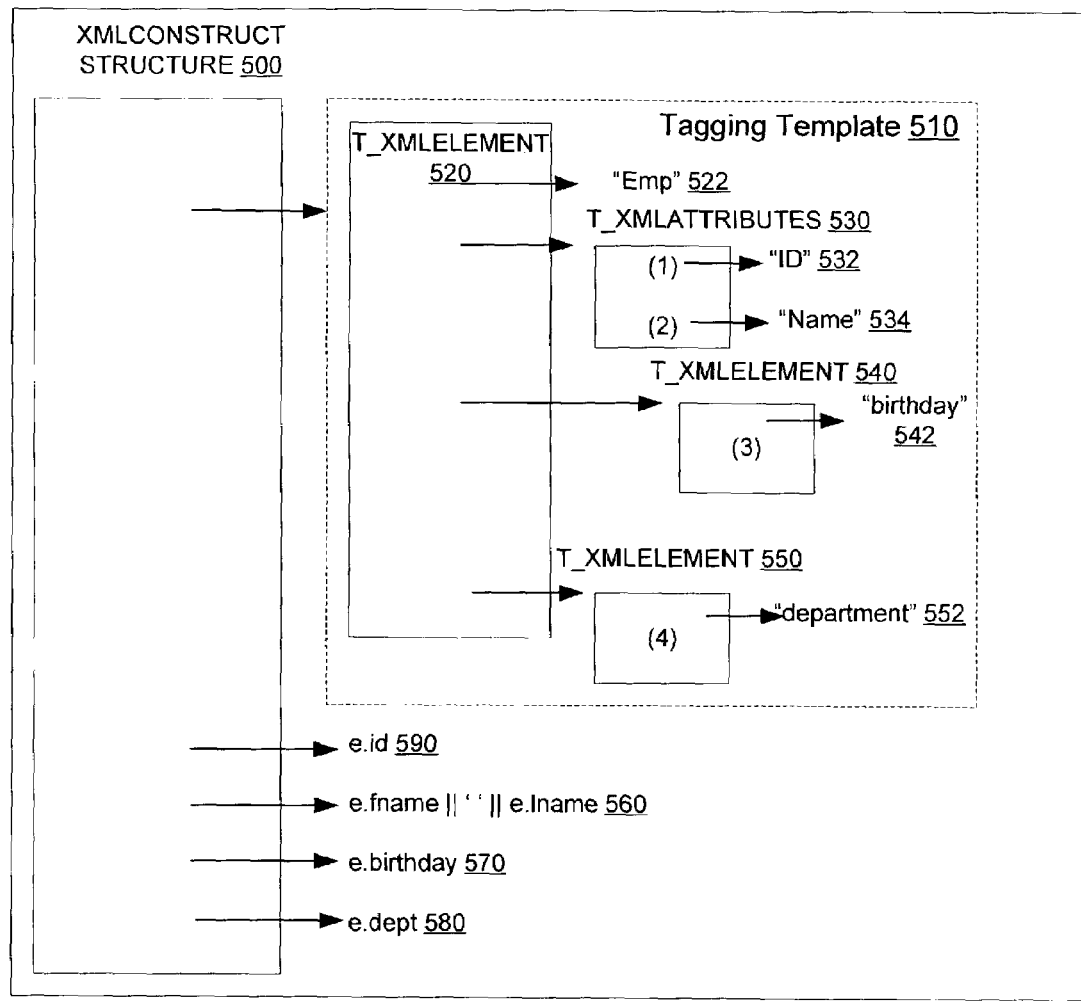
FIG. 5 illustrates a sample XMLCONSTRUCT structure that is generated for nested functions with multiple attributes in accordance with certain implementations of the invention.

In certain implementations, the composite function 150 is not generated, and, instead, a composite structure 151 that includes a tagging template 152 is generated. The composite structure including the tagging template 152 corresponds to a composite function 150 and is generated for a set of nested functions. A sample structure of a composite structure 151 including a tagging template 152 is illustrated in FIGS. 3 and 5, which are discussed below. The tagging template 152 is a structure of nodes for XML elements and XML attributes for the nested functions. It is to be understood that the structure of the composite structure 151 and the tagging template 152 may vary from the examples illustrated herein without departing from the scope of the invention.

A tree structure 190 in a parse tree is generated for a nested function. That is, the nested functions are parsed into a parse tree format. The tree structure 190 is used to generate the composite function 150 and the composite structure 151 that includes a tagging template 152.

At bind time, the nested functions (e.g., the XMLELEMENT function in SELECT statement (3)) are represented in a tree structure 190 in a parse tree (i.e., the nested functions are parsed into a parse tree format). Bind time refers to the time during which the functions are processed and an execution plan for executing the function is developed. On the other hand, execution time refers to the time during which the function is evaluated against the argument input values.

The following is a sample SELECT statement (3) with nested functions:

```
SELECT XMLELEMENT (NAME "Emp", XMLAT-
   TRIBUTES (e.fname ||' '|| e.lname AS "name"),
   XMLFOREST (e.birthday, e.dept AS "depart-
   ment")) FROM EMPLOYEE e;                    (3)
```

Figure 2A:
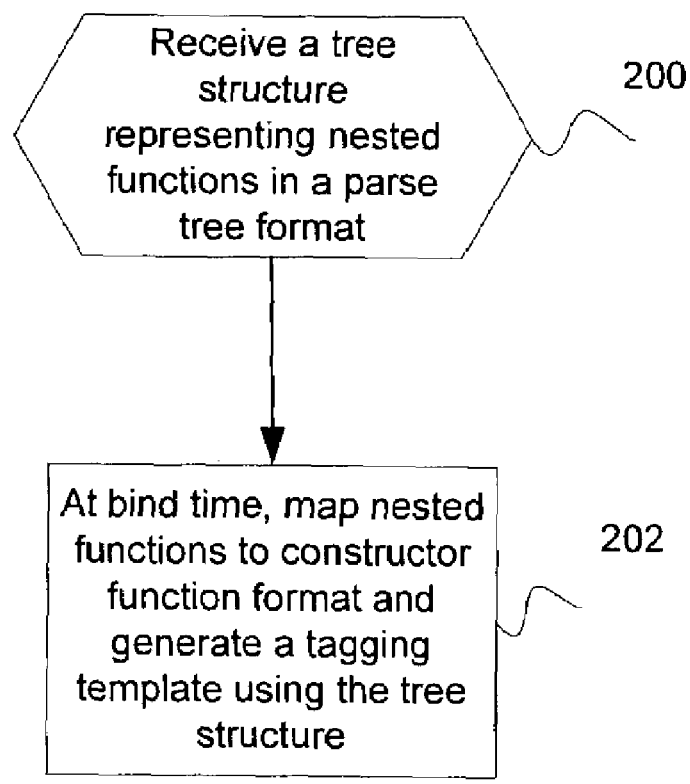
FIG. 2A illustrates logic implemented in a nested function processor at bind time in accordance with certain implementations of the invention.

FIG. 2A illustrates logic implemented in nested function processor 140 at bind time in accordance with certain implementations of the invention. In FIG. 2A, control begins at block 200 with the nested function processor 140 receiving a tree structure 190 representing the nested functions in parse tree format.

In block 202, at bind time, the nested function processor 140 maps the nested functions to a composite function 150 and generates a composite structure 151 that includes a tagging template 152 for the nested functions using the tree structure 190. The processing for the nested functions at bind time by the composite function 140 is bottom-up (i.e., the inner most function is evaluated first). To convert the nested functions (e.g., XMLELEMENT, XMLATTRIBUTES, and XMLFOREST) into a single composite function 150 (e.g., XMLCONSTRUCT), the tree structure 190 is traversed and processed top-down. Additionally, the tagging template and the list of arguments are built by concatenating the elements from each function that are to be part of the tagging template and the list of arguments.

For example, the nested functions are mapped to an XMLCONSTRUCT function format to generate a composite function. Additionally, the tagging template is used to describe the nesting and concatenation structure. In certain implementations, the generation of the composite function 150 and the composite structure 151 that includes the tagging template 152 occur simultaneously.

Figure 2B:
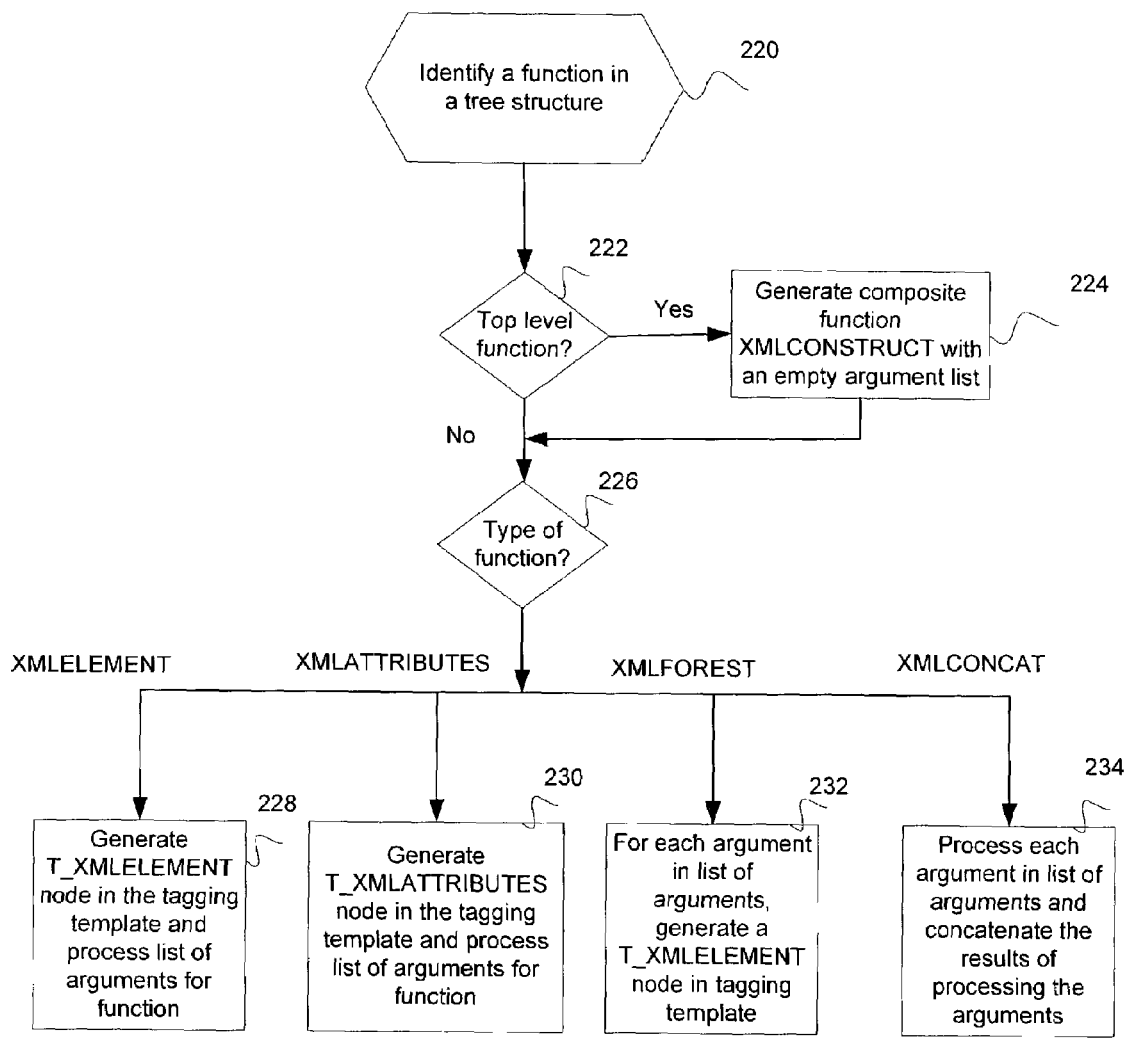
FIG. 2B illustrates logic implemented in nested function processor to process a function in a tree structure in accordance with certain implementations of the invention.

FIG. 2B illustrates logic implemented in nested function processor 140 to process a function in a tree structure 190 in accordance with certain implementations of the invention. Control begins at block 220 with the nested function processor 140 identifying a function in a tree structure 190. In block 222, the nested function processor 140 determines whether the function is a top level function. If the function is a top level function, processing continues to block 224, otherwise, processing continues to block 226. In block 224, the nested function processor 140 generates a composite function XMLCONSTRUCT with an empty argument list.

In block 226, the nested function processor 140 determines which type of function has been identified. If the function is an XMLELEMENT function, processing continues to block 228, and the nested function processor 140 generates a T_XMLELEMENT node in the tagging template 152 and processes the list of arguments for the XMLELEMENT function. If the function is an XMLATTRIBUTES function, processing continues to block 230, and the nested function processor 140 generates a T_XMLATTRIBUTES node in the tagging template 152 and processes the list of arguments for the XMLATTRIBUTES function. If the function is an XMLFOREST function, processing continues to block 232, and, for each argument in the list of arguments of the XMLFOREST function, the nested function processor 140 generates a T_XMLELEMENT node in the tagging template 152. If the function is an XMLCONCAT function, processing continues to block 234, and the nested function processor 140 processes each argument in the list of arguments of the XMLCONCAT function and concatenates the results of processing the arguments. In particular, for an XMLCONCAT function, the structures and arguments are linked (e.g., in a list or array). Arguments are appended to an argument list in the composite structure 151. Moreover, each argument in the list of arguments is processed sequentially and recursively to be added to the tagging template 152 (e.g., by constructing a node representing the argument).

Thus, for each argument of an XMLELEMENT function, if the argument is a constant, the argument is added to the tagging template (referenced from T_XMLELEMENT node). If the argument of the XMLELEMENT function is a SQL expression, the SQL expression is added to the list of arguments of the composite function 150, and the SQL expression is referenced using its ordinal number (e.g., the second argument in the list of arguments has ordinal number (2)). If the argument of the XMLELEMENT function is a nested function, the function processing of FIG. 2B is recursively called and results in pointing to the resulting nodes in the tagging template 152.

The XMLATTRIBUTES function is similarly processed, but involves a name and value for each argument.

The optimization technique of implementations of the invention combines nested XML publishing functions into a single composite function such that the input arguments from different levels of the nested XML publishing functions are combined into a single-level list. Certain implementations of the invention use a composite function 140 as the composite function. For example, for SELECT statement (3), the composite function 140 generates an XMLCONSTRUCT function (4).

XMLCONSTRUCT (reference_to_tagging_template, e.fname ∥' '∥ e.lname, e.birthday, e.dept) (4)

As a result of the mapping to the XMLCONSTRUCT function format, all the nested scalar functions (i.e., XMLELEMENT, XMLATTRIBUTES, and XMLFOREST) become flat without nesting. The result is that the XMLCONSTRUCT function evaluation process avoids unnecessary data movement.

FIG. 3 illustrates a sample XMLCONSTRUCT structure 300 representing an XMLCONSTRUCT function that is generated for nested functions in SELECT statement (3) in accordance with certain implementations of the invention. The XMLCONSTRUCT structure 300 is an example of a composite structure 151. The illustrated XMLCONSTRUCT structure 300 illustrates the format of a constructor structure for a composite function 150 in accordance with certain implementations of the inventions. Other formats for the constructor structure may be used without departing from the scope of the invention. The nested function processor 140 generates the XMLCONSTRUCT structure 300. XMLCONSTRUCT structure 300 references a tagging template 310. The XMLCONSTRUCT structure 300 also references a list of arguments identifying arguments to the composite function 150 and which correspond to the arguments marked with numbers in the tagging template 310. The list of arguments are e.fname ∥' '∥ e.lname 360, e.birthday 370, and e.dept 380.

The tagging template 310 includes a T_XMLELEMENT node 320, which represents the XMLELEMENT function. For ease of reference, a "T_" prefix will be used to indicate that a node is in a tagging template. The T_XMLELEMENT node 320 specifies an XML element with a name from the XMLELEMENT function, which in this example is "Emp" 322. If there are attributes nested within the XMLELEMENT function, the T_XMLELEMENT node 320 also references one or more XMLATTRUBUTES functions. In this example, the T_XMLELEMENT node 320 references T_XMLATTRIBUTES node 330, which in turn references an attribute "Name" 332. In the tagging template, the argument to be used during serialization is marked with a number (e.g., (1), (2), (3) etc. in the tagging template) that corresponds to the ordinal number of arguments that follows the tagging template in the XMLCONSTRUCT structure 300. The T_XMLELEMENT node 320 also references the XML elements that are generated for each argument of an XMLFOREST function. In this example, the T_XMLELEMENT node 320 references T_XMLELEMENT node 340, which has element name "birthday" 342 and content (2), where content (2) corresponds to the value of the second argument from the argument list, and T_XMLELEMENT node 350, which has element name "department" 352 and content (3), where content (3) corresponds to the value of the third argument from the argument list.

In certain implementations, the binding of the functions in SELECT statement (3) proceeds as follows. First, any top-level scalar XML function (e.g., XMLELEMENT) becomes an XMLCONSTRUCT function. For example, the XMLELEMENT function in SELECT statement (3) becomes XMLCONSTRUCT function (4). Additionally, a top-level node for the tagging template 310) is constructed, which is a T_XMLELEMENT node 320, with element name "Emp" 322.

Second, when the XMLATTRIBUTES function is processed in SELECT statement (3), the argument of the XMLATTRIBUTES function is added to the XMLCONSTRUCT function (4) list of arguments and a T_XMLATTRIBUTES node 330 is constructed in the tagging template 310. In this case, the name of the single attribute is "name", and the value of the attribute is the first argument 360 in the argument list for the XMLCONSTRUCT structure 300. So, e.fname ∥' '∥ e.lname is in the argument list of the XMLCONSTRUCT function (4) and the XMLCONSTRUCT structure 300. In certain implementations, the XMLCONSTRUCT structure 300 is built, but the XMLCONSTRUCT function (4) is not generated.

Third, when the XMLFOREST function is processed, the XMLFOREST function is converted into a list of XMLELEMENTS, one for each of its arguments. In this example, two T_XMLELEMENT nodes 340, 350 are constructed in the tagging template 310. In the tagging template 310, T_XMLELEMENT nodes 340, 350 are connected to the current parent node, which is the top-level T_XMLELEMENT node 320. Also, two more arguments, e.birthday 370 and e.dept 380, are added to the list of arguments for the XMLCONSTRUCT function (4) and the XMLCONSTRUCT structure 300.

Figure 2C:
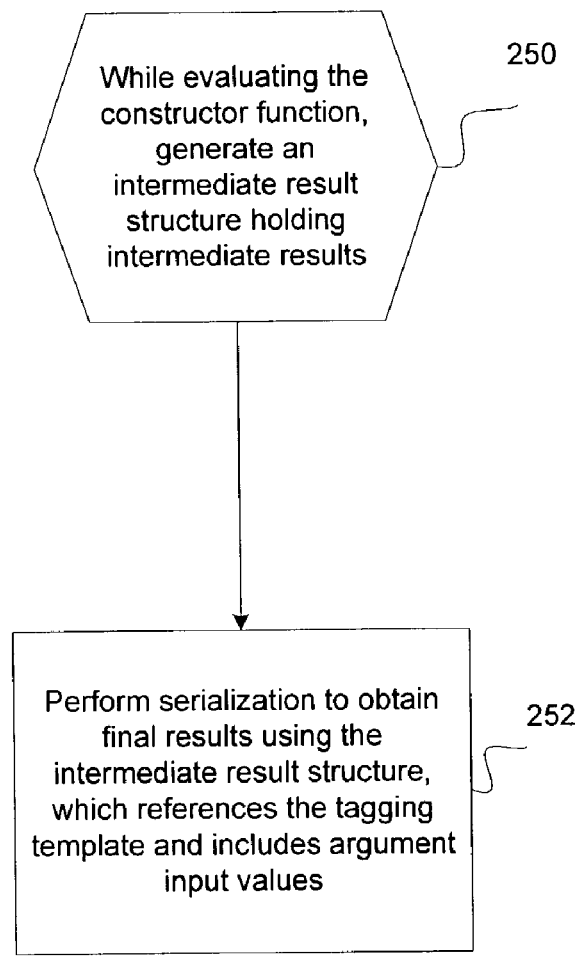
FIG. 2C illustrates logic implemented in a nested function processor at execution time in accordance with certain implementations of the invention.
Figure 4:
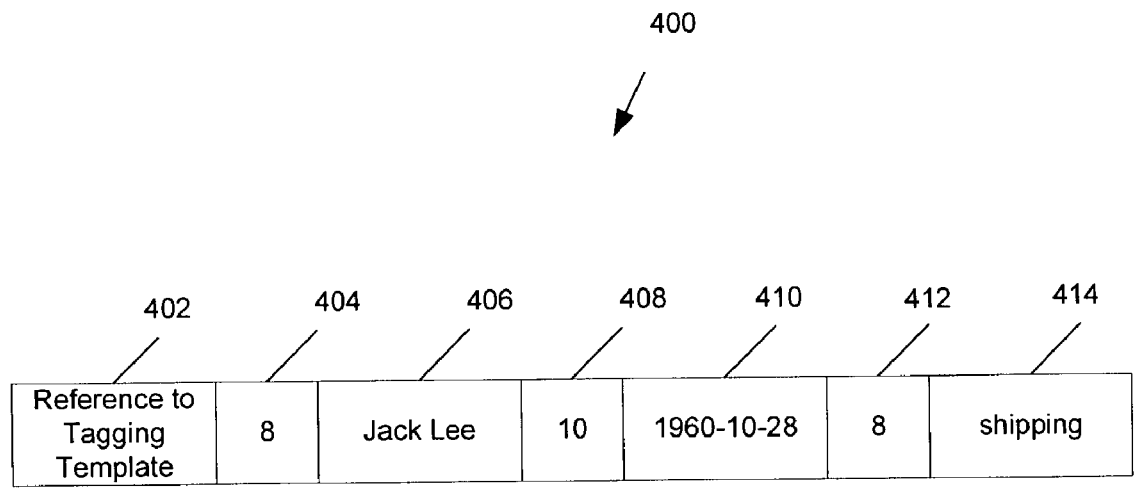
FIG. 4 illustrates a sample intermediate result structure in accordance with certain implementations of the invention.

FIG. 2C illustrates logic implemented in nested function processor 140 at execution time in accordance with certain implementations of the invention. Control begins at block 250 with the nested function processor 140 generating an intermediate result structure holding intermediate results while evaluating the composite function 150. FIG. 4 illustrates a sample intermediate result structure 400 in accordance with certain implementations of the invention. The intermediate result structure 400 holds intermediate results (e.g., argument input values) that are used by the composite function 150 representing the different levels of the nested functions. In certain implementations, the intermediate result structure 400 may be a list or an array. For the following argument input values, fname='Jack', lname='Lee', birthday='10-28-1960', and dept='shipping', intermediate result structure 400 is generated, in which the numbers represent the length of the character strings for each argument input value. For example, a reference to a tagging template 402 is included in intermediate result structure 400. In certain implementations, the intermediate result structure 400 also includes a header (not shown) with additional information (e.g., an indication that this structure is an intermediate result structure). In certain implementations, the reference to the tagging template 402 is part of a header for the intermediate result structure 400. The intermediate result structure then includes the length of each argument input value followed by the content of the input value. For example, assuming that characters are encoded using Universal Transformation Format-8 (UTF-8, in which each character is one byte long), length 404 indicates that the argument input value "Jack Lee" is 8 bytes in length. Length 408 indicates that the argument input value "1960-10-28" 410 is 10 bytes in length. Length 412 indicates that the argument input value "shipping" 414 is 8 bytes in length.

Alternatively, at the execution time, the nested function processor 140 can generate a Document Object Model (DOM) tree or other data structures based on the tagging template 152 and argument input values. A DOM tree is based on a Document Object Model (DOM) recommendation by the World Wide Web Consortium (W3C) for access and representation of XML documents. Other data structures could be based on other standards, such as InfoSet, or XPath and XQuery data models defined by W3C.

In block 252, the nested function processor 140 performs serialization to obtain a final result using the intermediate result structure 400, which references the tagging template 310 and includes argument input values.

In generating a final result for the XMLCONSTRUCT structure 300, the nested function processor 140 traverses the tagging template 310 and the argument input values of the intermediate structure 400 to create a serialized text string. This process of traversing the tagging template 310 and the argument input values and creating a serialized text string is referred to as "serialization."

During serialization, if a T_XMLELEMENT is encountered, a start tag (starting with <) is generated for the element, and the nested function processor 140 determines whether there are any attributes for the XML element. If there are one or more T_XMLATTRIBUTES nodes in the tagging template 310, the attributes are included in the start tag, by traversing the attribute list in the tagging template 310 to generate an attribute list in the form of: <attribute name>='<value>' (e.g., fname='Jack', lname='Lee'). The value is obtained by the nested function processor 140 from the intermediate structure 400. If there are no attributes, the nested function processor 140 ends the start tag with an end tag (>).

If there are additional XMLELEMENT contents to process in the tagging template 310, they are inserted between the start tag and the end tag of the current XML element. Any nested T_XMLELEMENT or T_XMLATTRIBUTES functions in the tagging template 310 are traversed and processed in the same manner, recursively. In particular, the nested function processor 140 again generates tags to indicate the beginning and ending of the XMLELEMENTS and generates attribute lists (if there are attributes) for the XMLELEMENTS.

The result of serialization of the tagging template 310 is:

<Emp name="Jack Lee"><birthday>1960-10-28 </birthday><department>shipping</department></Emp>

At execution time, late tagging is used to avoid unnecessary duplicates of serialized text strings. Late tagging refers to evaluating the function without putting tags around the input argument values in the intermediate structure. These tags are added to the final result during serialization.

FIG. 5 illustrates a sample XMLCONSTRUCT structure 500 that is generated for nested functions (5) with multiple attributes in accordance with certain implementations of the invention. The XMLCONSTRUCT structure 500 is an example of a composite structure 151.

The XMLCONSTRUCT structure 500 is generated for the XMLELEMENT function in the set of nested functions (5), which has two attributes, e.id and e.fname ∥' '∥ e.lname.

```
XMLELEMENT(NAME "Emp",
    XMLATTRIBUTES(e.id as "id", e.fname ∥' '∥
    e.lname AS "name"), XMLFOREST(e.birthday,
    e.dept AS "department"))                            (5)
```

XMLCONSTRUCT structure 500 references T_XMLELEMENT node 520 in tagging template 510. The XMLCONSTRUCT structure 500 also references an argument list identifying arguments to the composite function 150 and which correspond to the arguments marked with numbers in the tagging template 510. Since there are multiple attributes, the arguments to the composite function 150 include both e.id 590 and e.fname ∥' '∥ e.lname 560, as well as, e.birthday 570 and e.dept 580.

The T_XMLELEMENT node 520 references the identifier of the XMLELEMENT, which in this example is "Emp" 522. In this example, the T_XMLELEMENT node 520 references T_XMLATTRIBUTES node 530, which specifies an attribute "ID" 532 and an attribute "Name" 534. The T_XMLELEMENT node 520 also references the XML elements that are generated for each argument of an XMLFOREST function. In this example, the T_XMLELEMENT node 520 references T_XMLELEMENT 540, which has name "birthday" 542 and content (3) from the third argument of the argument list, and T_XMLELEMENT 550, which has name "department" 552 and content (4) from the fourth argument of the argument list.

In addition, with late tagging, for repetitive tagging patterns of an XMLAGG function, one copy of the tagging template is maintained until a serialized text string is generated for each row on which the XMLAGG function operates. A serialized text string is the output of the composite function 150.

In particular, for an XMLAGG function, serialization refers to traversing the tagging template 152 and the intermediate result structure 400 to build an XML result. Therefore, tagging templates also reduce the size of intermediate results when an XMLAGG function is involved.

For example, if the scalar function in SELECT statement (3) is in turn the argument of the XMLAGG function, then one tagging template may be used (rather than one tagging template for each employee). The following SELECT statement (6) includes an XMLAGG function:

```
SELECT XMLAGG (XMLELEMENT (NAME
    "Emp", XMLATTRIBUTES (e.fname ∥' '∥
    e.lname AS "name"), XMLFOREST
    (e.birthday, e.dept AS "department")) FROM
    EMPLOYEE e;                                          (6)
```

For the XMLAGG function in SELECT statement (6), the intermediate result values of the same group are linked together using a doubly-linked list, and they all share the same tagging template.

In summary, implementations of the invention provide a new optimization technique that minimizes data movement and copying when processing XML functions. In particular, implementations of the invention use tagging templates and a late tagging technique.

DB2 is a trademark of International Business Machines Corporation.

ADDITIONAL IMPLEMENTATION DETAILS

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Although implementations of the invention indicate that the generation of the composite function 150 and the tagging template 152 occur simultaneously, in additional implementations, they may be generated in any order. For example, the tagging template 152 maybe generated before the composite function 150 or after.

Although implementations of the invention refer to an intermediate result structure as a list or an array, there are many variations for the intermediate result structure. For example, in certain implementations, the intermediate result structure may be a linked list.

The logic of FIGS. 2A, 2B, and 2C describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, and 2C was described as being implemented in software. The logic may be implemented in hardware or in programmable and non-programmable gate array logic.

Figure 6:
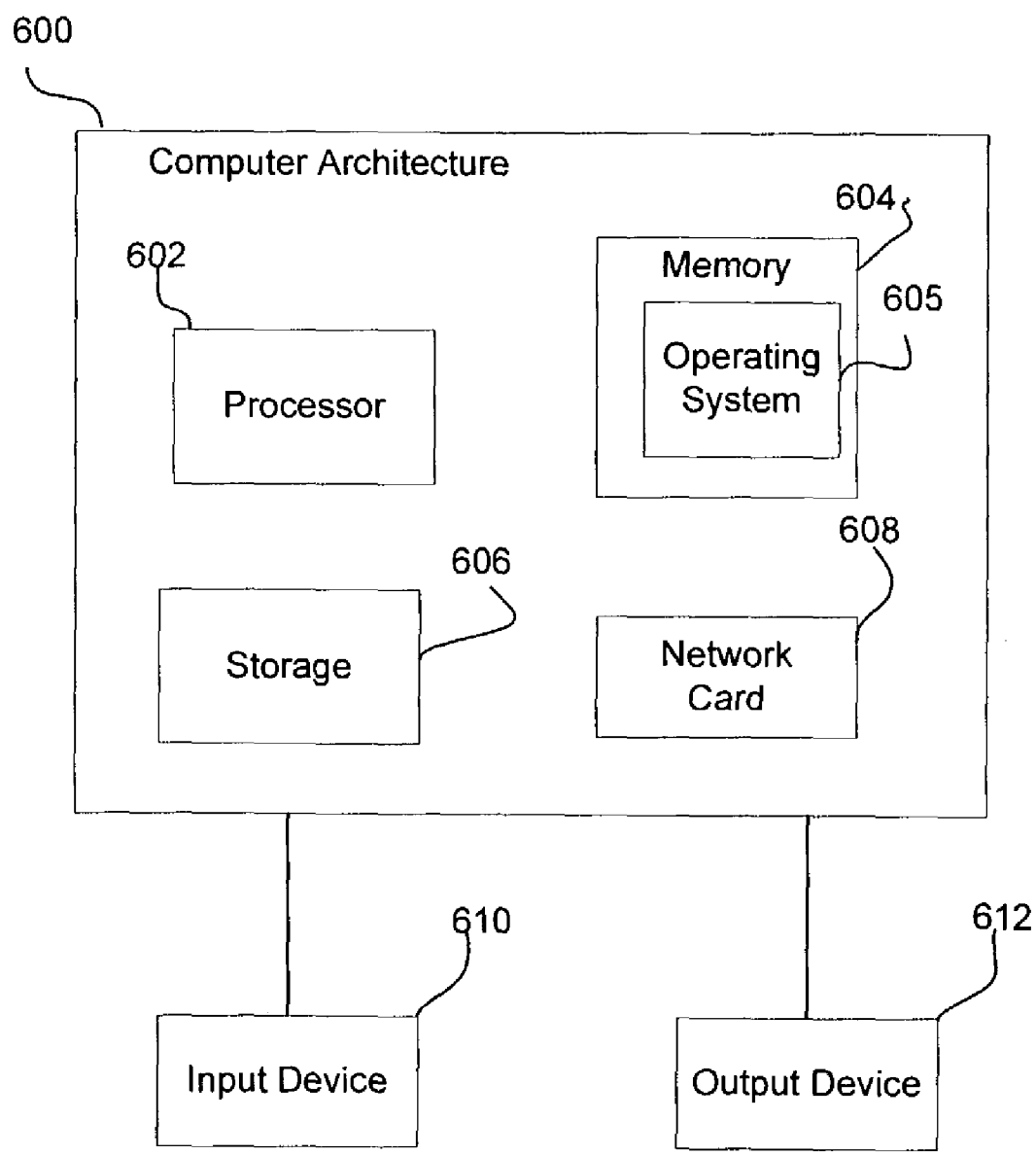
FIG. 6 illustrates one implementation of the architecture of the computer systems of FIG. 1 in accordance with certain implementations of the invention.

FIG. 6 illustrates one implementation of the architecture of the computer systems 100 and 120 in accordance with certain implementations of the invention. The computer systems 100 and 120 may implement a computer architecture 600 having a processor 602 (e.g., a microprocessor), a memory 604 (e.g., a volatile memory device), and storage 606 (e.g., a non-volatile storage, such as magnetic disk drives, optical disk drives, a tape drive, etc.). An operating system 605 may execute in memory 604. The storage 606 may comprise an internal storage device or an attached or network accessible storage. Programs in the storage 606 are loaded into the memory 604 and executed by the processor 602 in a manner known in the art. The architecture further includes a network card 608 to enable communication with a network. An input device 610 is used to provide user input to the processor 602, and may include a keyboard, mouse, pen-stylus, microphone, touch sensitive display screen, or any other activation or input mechanism known in the art. An output device 612 is capable of rendering information transmitted from the processor 602, or other component, such as a display monitor, printer, storage, etc.

The computer 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for processing a function, comprising:
    receiving a set of nested functions;
    at bind time,
        generating a composite function for a highest level in the set of nested functions, wherein the composite function receives arguments of the set of nested functions as input; and
        generating a tagging template for the set of nested functions that corresponds to the composite function; and
    at execution time,
        generating an intermediate result structure that includes a reference to the tagging template and one or more argument input values; and
        producing a result by evaluating the composite function using the tagging template, wherein the intermediate result structure is used to produce the result, wherein the results are produced by performing serialization by traversing the tagging template and the intermediate result structure, and wherein the result is stored in storage.

2. The method of claim 1, wherein the tagging template comprises a structure of nodes for XML elements and XML attributes for the set of nested functions.

3. The method of claim 1, wherein the tagging template is part of a composite structure that includes an argument list for arguments in the set of nested functions.

4. The method of claim 1, wherein the set of nested functions includes an XMLATTRIBUTES function and wherein the tagging template includes an XMLATTRIBUTES node corresponding to the XMLATTRIBUTES function.

5. The method of claim 1, wherein the set of nested functions includes an XMLFOREST function and wherein the tagging template includes an XMLELEMENT node for each XML element generated by evaluating the XMLFOREST function.

6. The method of claim 1, wherein the composite function is generated for the set of nested functions.

7. The method of claim 1, wherein the composite function receives as input a reference to the tagging template and a list of arguments.

8. A system for processing a function, comprising:
    a processor;
    a memory coupled to the processor;
    at least one program executed by the processor in the memory to cause the processor to perform:
        (i) receiving a set of nested functions;
        at bind time,
            (ii) generating a composite function for a highest level in the set of nested functions, wherein the composite function receives arguments of the set of nested functions as input; and
            (iii) generating a tagging template for the set of nested functions that corresponds to the composite function; and
        at execution time,
            (iv) generating an intermediate result structure that includes a reference to the tagging template and one or more argument input values; and
            (v) producing a result by evaluating the composite function using the tagging template, wherein the intermediate result structure is used to produce the result, wherein the results are produced by performing serialization by traversing the tagging template and the intermediate result structure, and wherein the result is stored in storage.

9. The system of claim 8, wherein the tagging template comprises a structure of nodes for XML elements and XML attributes for the set of nested functions.

10. The system of claim 8, wherein the tagging template is part of a composite structure that includes an argument list for arguments in the set of nested functions.

11. The system of claim 8, wherein the set of nested functions includes an XMLATTRIBUTES function and wherein the tagging template includes an XMLATTRIBUTES node corresponding to the XMLATTRIBUTES function.

12. The system of claim 8, wherein the set of nested functions includes an XMLFOREST function and wherein the tagging template includes an XMLELEMENT node for each XML element generated by evaluating the XMLFOREST function.

13. The system of claim 8, wherein the composite function is generated for the set of nested functions.

14. The system of claim 8, wherein the composite function receives as input a reference to the tagging template and a list of arguments.

15. An article of manufacture embodied as a computer readable medium comprising one of volatile and non-volatile storage and including a program for processing a function, wherein the program causes operations to be performed, the operations comprising:
    receiving a set of nested functions;
    at bind time,
        generating a composite function for a highest level in the set of nested functions; and
        generating a tagging template for the set of nested functions that corresponds to the composite function, wherein the composite function receives arguments of the set of nested functions as input; and at execution time,
   generating an intermediate result structure that includes a reference to the tagging template and one or more argument input values; and
   producing a result by evaluating the composite function using the tagging template, wherein the intermediate result structure is used to produce the result, wherein the results are produced by performing serialization by traversing the tagging template and the intermediate result structure, and wherein the result is stored in storage.

16. The article of manufacture of claim 15, wherein the tagging template comprises a structure of nodes for XML elements and XML attributes for the set of nested functions.

17. The article of manufacture of claim 15, wherein the tagging template is part of a composite structure that includes an argument list for arguments in the set of nested functions.

18. The article of manufacture of claim 15, wherein the set of nested functions includes an XMLATTRIBUTES function and wherein the tagging template includes an XMLATTRIBUTES node corresponding to the XMLATTRIBUTES function.

19. The article of manufacture of claim 15, wherein the set of nested functions includes an XMLFOREST function and wherein the tagging template includes an XMLELEMENT node for each XML element generated by evaluating the XMLFOREST function.

20. The article of manufacture of claim 15, wherein the composite function is generated for the set of nested functions.

21. The article of manufacture of claim 15, wherein the composite function receives as input a reference to the tagging template and a list of arguments.

* * * * *